US009419902B1

(12) United States Patent
Sites

(10) Patent No.: US 9,419,902 B1
(45) Date of Patent: Aug. 16, 2016

(54) METHOD AND SYSTEM FOR NETWORK MICRO FLOW CONTROL

(71) Applicant: Google Inc., Mountain View, CA (US)

(72) Inventor: Richard Lee Sites, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 14/143,579

(22) Filed: Dec. 30, 2013

(51) Int. Cl.
*H04L 12/16* (2006.01)
*H04L 12/801* (2013.01)

(52) U.S. Cl.
CPC ...................... *H04L 47/18* (2013.01)

(58) Field of Classification Search
CPC .............. H04Q 11/0066; H04Q 2011/0064; H04L 12/5601; H04L 49/254; H04L 47/10
USPC .............. 370/230, 230.1, 231, 236, 329, 335, 370/336, 349, 473; 375/340; 709/217; 714/752
See application file for complete search history.

(56) References Cited

U.S. PATENT DOCUMENTS

| | | | |
|---|---|---|---|
| 6,044,061 | A | 3/2000 | Aybay et al. |
| 7,006,438 | B2 | 2/2006 | West et al. |
| 7,035,220 | B1 | 4/2006 | Simcoe |
| 7,039,013 | B2 | 5/2006 | Ruutu et al. |
| 7,298,728 | B2 | 11/2007 | Golla et al. |
| 8,542,585 | B2 | 9/2013 | McDaniel et al. |
| 2005/0232150 | A1 | 10/2005 | Nishimura |
| 2007/0002823 | A1* | 1/2007 | Skov Andersen et al. .... 370/349 |
| 2009/0207859 | A1* | 8/2009 | Beshai et al. ................. 370/474 |
| 2013/0188568 | A1* | 7/2013 | Kuo ............................... 370/329 |
| 2013/0201826 | A1* | 8/2013 | Testa ....................... H04L 47/10 370/230 |

FOREIGN PATENT DOCUMENTS

| | | |
|---|---|---|
| EP | 0981878 A1 | 3/2000 |
| WO | 2009029204 A2 | 3/2009 |

OTHER PUBLICATIONS

Jeyakumar et al., "EYEQ—Practical Network Performance Isolation for the Multi-tenant Cloud", USENIX Association, 2012, pp. 1-6.
Pek-Yew et al., "Micro-Flow Control Framework for Home Gateway", Singapore, Dec. 2000, pp. 94-98.

* cited by examiner

*Primary Examiner* — Charles C Jiang
*Assistant Examiner* — Wali Butt
(74) *Attorney, Agent, or Firm* — Lerner, David, Littenberg, Krumholz & Mentlik, LLP

(57) ABSTRACT

The present technology pertains to unilaterally interleaving individual data packets of long bursts of multi-packet messages in various sequence patterns to be sent to one or more receivers over a network. Before determining a pattern, the sending device attempts to reduce the transmission length of the long bursts of the data packets into multiple chunks. Subsequently, the sending device generates a sequence pattern of the individual data packets and consecutively transmits these packets to their respective receivers. The determined sequence pattern may be based upon outbound limits at the sender, inbound limits at the one or more receivers, and various transmission priorities. Moreover, the sender may limit the data flow of any message transmission. The present technology does not require feedback from the network's components or from the network itself to micro flow control the individual data packets.

18 Claims, 10 Drawing Sheets

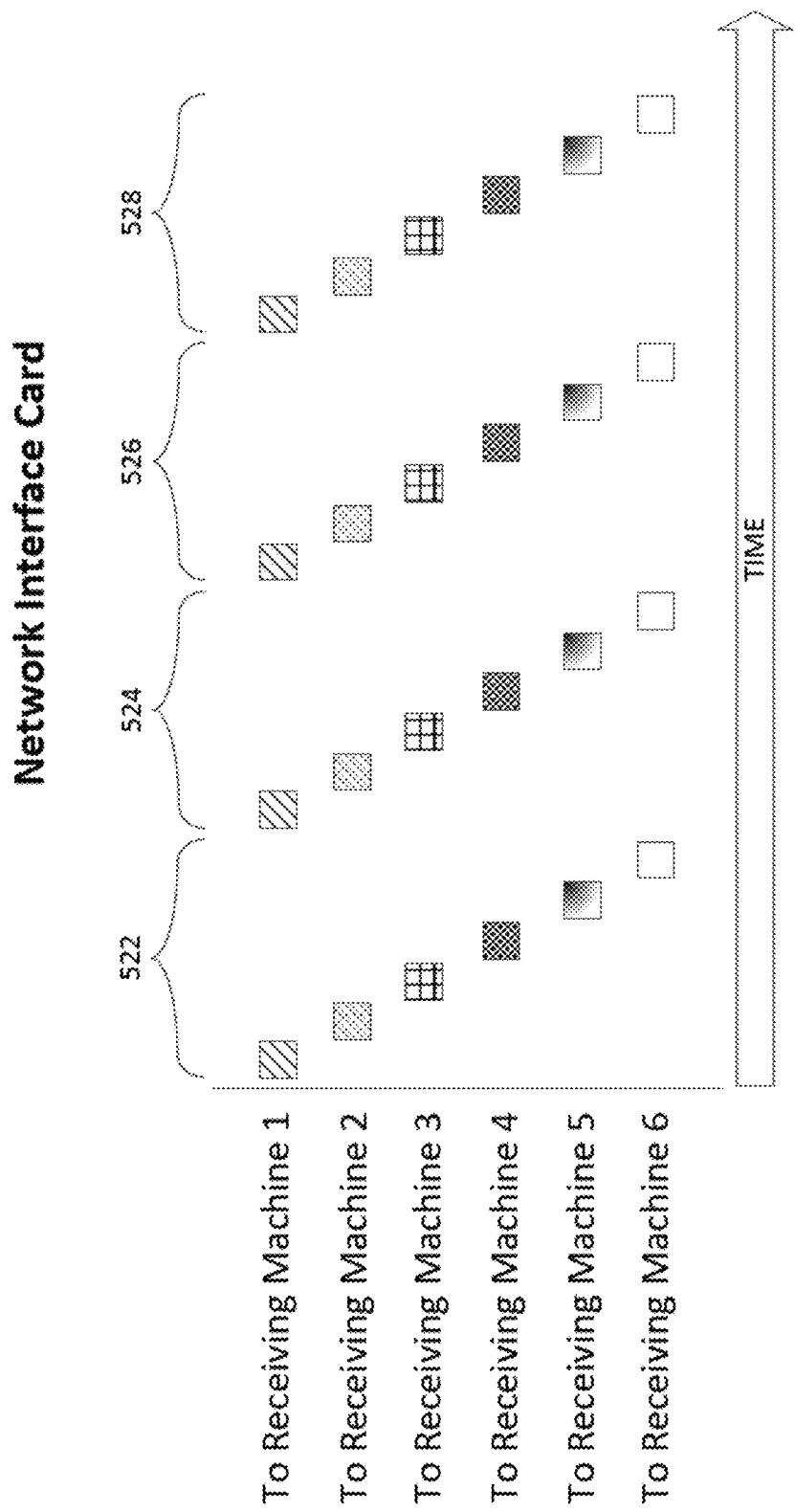

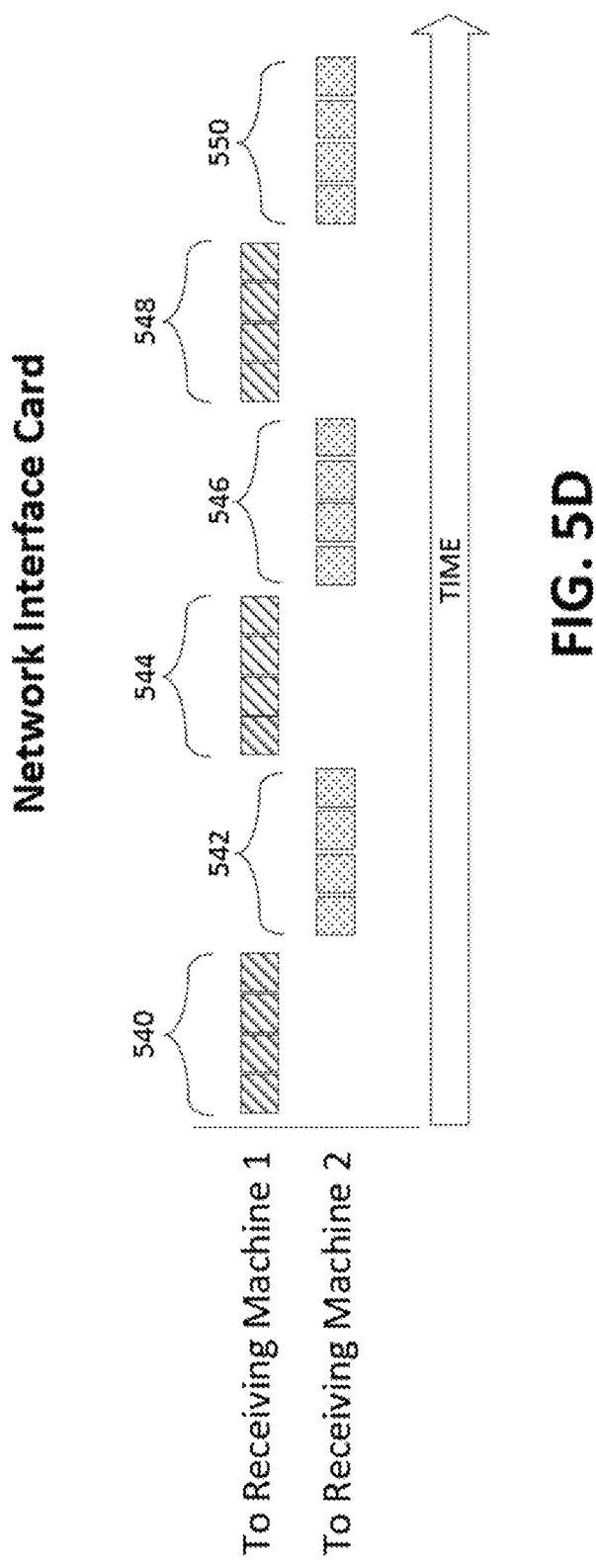

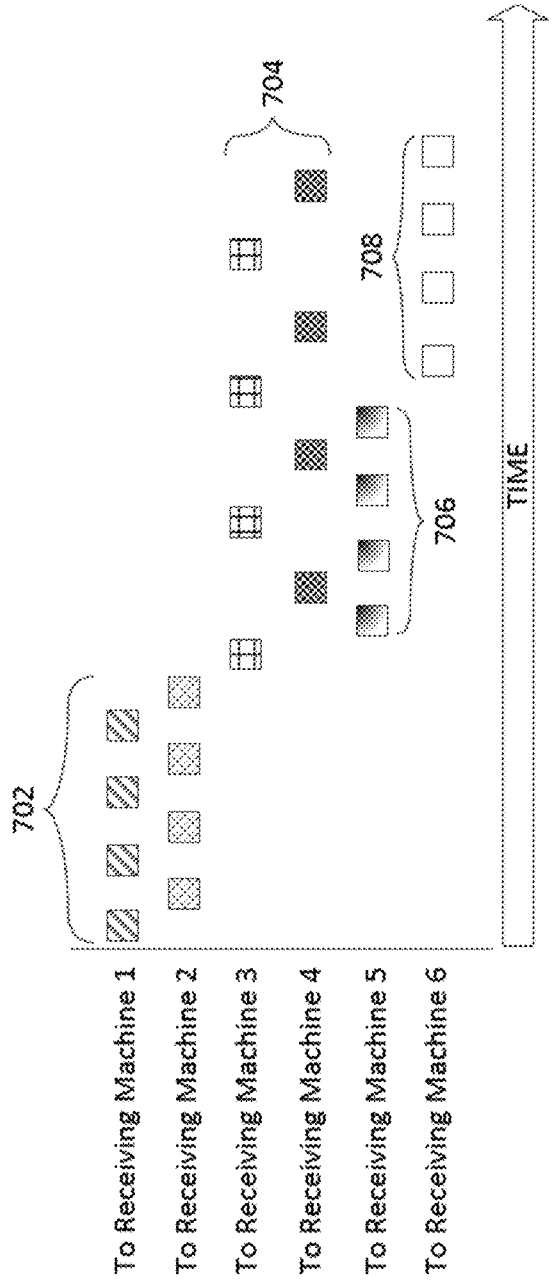

METHOD AND SYSTEM FOR NETWORK MICRO FLOW CONTROL

BACKGROUND

The booming growth of network communication (e.g., Ethernet, Wi-Fi, Token Ring) and the need to decrease message frames from dropping at various points during network congestion has prompted the use of data flow control techniques. At a high level, the concept of data flow control is the process of overseeing and managing the rate of data transmission between various nodes of a network. For instance, if the rate of data transmission from a sending node is faster than the rate at which a receiving node can handle, then the device (e.g., switch) at the receiving node will send a signal to the sending node to temporarily stop transmission until it can catch up to speed.

A simple example of flow control is the stop-and-wait technique. In this particular example, the message to be transmitted is broken down into multiple frames. The receiver indicates that it is ready to receive data for each frame. The sender then sends the first frame. Meanwhile, the sender waits and listens for an acknowledgement ("ACK") from the receiver to ensure that it has correctly received the frame. Only after the sender receives an ACK will it send the next frame.

Another example is Ethernet flow control. This technique stops and resumes the transmission of network traffic between two nodes on a full-duplex Ethernet physical link. By pausing and restarting data transmission, Ethernet flow control prevents buffers on the receiving nodes from overflowing and dropping frames. One way to pause data transmission is using an Ethernet PAUSE frame. PAUSE frames can be sent in both directions on the link. The receiver will transmit a PAUSE frame to the sender telling it to stop sending more traffic. On the other side, the sender will respond to the PAUSE frame and stop sending traffic.

Unfortunately, many conventional flow control techniques are inefficient and prone to transmission errors. For instance, if there are multi-packet messages simultaneously pending to be sent to a plurality of machines at various switches, an ACK or a PAUSE frame received from just one switch may significantly delay and back-up the transmission of all the messages. This results in undesirable time delay in message transmissions. Furthermore, the probability of a network switch dropping data packets increases when it attempts to receive long bursts of packets from multiple senders at approximately the same time. When data packets get dropped, the sending device has to retransmit these packets until their receipt is acknowledged from the receiver.

BRIEF SUMMARY

The present technology pertains to unilaterally patterning and transmitting individual data packets over a network without the need to receive feedback from any of the network's components or from the network itself. More particularly, the present technology relates to a sending device preemptively interleaving the individual data packets in specific patterns and consecutively transmitting them together to multiple target receivers to reduce buffering needs in switching fabrics. By doing so, the sending device reduces buffering needs in switching fabrics and also reduces the number of dropped data packets.

In accordance with one scenario, a method for transmitting packets over a computer network via a network interface device comprises obtaining a plurality of messages to be transmitted, via the network, as bursts of data packets to a plurality of respective receivers, wherein one or more data packets of each burst associated with one of the plurality of messages are arranged to be transmitted in a particular time block. Further, the method comprises the network interface device arranging, in an order, the one or more data packets of each burst for transmission to different ones of the plurality of respective receivers and generating, by the network interface device, a first transmission sequence pattern by interleaving one or more data packets associated with a first one of the plurality of messages with one or more data packets associated with a second one of the plurality of messages. Additionally, the method comprises transmitting, by the network interface device, in a first time block, the interleaved data packets of the first transmission sequence pattern consecutively to the respective receivers.

In one example, the method further comprises transmitting, in a second time block following the first time block, one or more data packets associated with a third message. Further, the method further comprises generating, by the network interface device, a second transmission sequence pattern by interleaving one or more data packets associated with a third message with one or more data packets associated with a fourth message; and transmitting, in a second time block, the interleaved data packets of the second transmission sequence pattern consecutively to the respective receivers after the first time block.

In another example, the method further comprises applying an outbound limit to the first transmission sequence pattern, the outbound limit reducing a rate of transmission of the interleaved data packets of the first transmission sequence pattern, whereby transmission of the interleaved data packets in the first time block according to the outbound limit elongates a length of time of the first time block. Moreover, the rate of transmission is reduced in half.

In yet another example, the method further comprises defining an inbound limit associated with data packet congestion at a buffer of the respective receiver, the inbound limit reducing a rate of transmission of the interleaved data packets of the first transmission sequence pattern, whereby transmission of the interleaved data packets of the first transmission sequence pattern according to the inbound limit elongate a length of time of the first time block. Additionally, the method further comprises interleaving, by the network interface device, one or more data packets associated with a third message in between one or more time gaps of the elongated length of time of the first time block; and transmitting the one or more data packets associated with the third message consecutively together in the elongated first time block.

In a further example, the method further comprises defining an inbound limit associated with the data packet congestion at a buffer of the respective receiver, the inbound limit reducing a rate of transmission of the interleaved data packets of the second transmission sequence pattern, whereby transmission of the interleaved data packets of the second transmission sequence pattern according to the inbound limit elongate a length of time of the second time block.

In another example, the method further comprises interleaving, by the network interface device, one or more data packets associated with one or more remaining messages in between one or more time gaps of the elongated length of time of the second time block; and transmitting the one or more data packets associated with the remaining messages consecutively together in the elongated second time block.

In accordance with another scenario, a system for controlling packet transmissions over a computer network comprises at least one network interface device configured to obtain a plurality of messages to be transmitted, via the network, as bursts of data packets to a plurality of respective receivers, wherein one or more data packets of each burst associated with one of the plurality of messages are arranged to be transmitted in a particular time block, and arrange, in an order, the one or more data packets of each burst for transmission to different ones of the plurality of respective receivers. In addition, the network interface device is configured to generate a first transmission sequence pattern by interleaving one or more data packets associated with a first one of the plurality of messages with one or more data packets associated with a second one of the plurality of messages. The system further comprises a transmitter module, controlled by at least one processor, configured to transmit, in a first time block, the interleaved data packets of the first transmission sequence pattern consecutively to the respective receivers.

In one example, the transmitter module is further configured to transmit, in a second time block following the first time block, one or more data packets associated with a third message. Moreover, the network interface device is further configured to generate a second sequence pattern by interleaving one or more data packets associated with a third message with one or more data packets associated with a fourth message; and the transmitter module is further configured to transmit, in a second time block, the interleaved data packets of the second transmission sequence pattern consecutively to the respective receivers after the first time block.

In a different example, the system further is configured to apply an outbound limit to the first transmission sequence pattern, the outbound limit reducing a rate of transmission of the interleaved data packets of the first transmission sequence pattern, whereby transmission of the interleaved data packets in the first time block according to the outbound limit elongates a length of the first time block. Further, the rate of transmission is reduced in half.

In another example, the system is configured to define an inbound limit associated with data packet congestion at a buffer of the respective receiver, the inbound limit reduces a rate of transmission of the interleaved data packets of the first transmission sequence pattern, whereby transmission of the interleaved data packets of the first transmission sequence pattern according to the inbound limit which elongates a length of time of the first time block. The network interface device is further configured to interleave one or more data packets associated with a third message in between one or more time gaps of the elongated length of time of the first time block; and the transmitter module is further configured to transmit the one or more data packets associated with the third message consecutively together in the elongated first time block.

In yet another example, the system is further configured to define an inbound limit associated with the data packet congestion at a buffer of the respective receiver, the inbound limit reduces a rate of transmission of the interleaved data packets of the second transmission sequence pattern according to the inbound limit which elongates a length of time of the second time block.

In a further example, the network interface device is further configured to interleave one or more data packets associated with one or more remaining messages in between one or more time gaps of the elongated length of time of the second time block; and the transmitter module is further configured to transmit the one or more data packets associated with the remaining messages consecutively together in the elongated second time block.

In accordance with yet another scenario, a method for transmitting packets over a computer network via a network interface device comprises obtaining a plurality of messages to be transmitted, via the network, as bursts of data packets to a plurality of respective receivers, wherein data packets of each burst associated with one of the plurality of messages are arranged to be transmitted in a particular time block and the network interface device arranging in, an order, the one or more data packets of each burst for transmission to different ones of the plurality of respective receivers. Further, the method comprises generating, by the network interface device, a first transmission sequence pattern comprising at least two data packets associated with a first message; generating, by the network interface device, a second transmission sequence pattern comprising at least two data packets associated with a second message; and generating, by the network interface device, a third transmission sequence pattern comprising at least two data packets associated with the first message. The method also comprises transmitting, by the network interface device, in a first time block, the data packets of the first transmission sequence pattern consecutively to a first one of the plurality of receivers; transmitting, by the network interface device, in a second time block, the data packets of the second transmission sequence consecutively to a second one of the plurality of receivers after the first time block; and transmitting, by the network interface device, in a third time block, the data packets of the third transmission sequence pattern consecutively to the first one of the plurality of receivers after the first time block.

In accordance with a final scenario, a system for controlling packet transmissions over a computer network, comprises at least one network interface device, and a transmitter module controlled by at least one processor, wherein the transmitter module is configured to obtain a plurality of messages to be transmitted, via the network, as bursts of data packets to a plurality of respective receivers, wherein the data packets of each burst associated with one of the plurality of messages are to be transmitted in a particular time block. In addition, the network interface device is configured to arrange, in order, the one or more data packets of each burst for transmission to different ones of the plurality of respective receivers; and generate a first transmission sequence pattern comprising at least two data packets associated with a first message, generate a second transmission sequence pattern comprising at least two data packets associated with a second message, and generate a third transmission sequence pattern comprising at least two data packets associated with the first message. Further, the transmitter module is configured to transmit, in a first time block, the data packets of the first transmission sequence pattern consecutively to a first one of the plurality of receivers, transmit, in a second time block, the data packets of the second transmission sequence pattern consecutively to a second one of the receivers after the first time block, and transmit, in a third time block, the data packets of the third transmission sequence pattern consecutively to the first one of the plurality of receivers after the first time block.

BRIEF DESCRIPTION OF THE DRAWINGS

FIGS. 5B-D are timing diagrams of exemplary transmission sequence patterns of micro flow controlled data packets in accordance with aspects of the present disclosure.

FIG. 7 is a timing diagram of an exemplary transmission sequence pattern of micro flow controlled data packets with inbound limits in accordance with one aspect of the present disclosure.

DETAILED DESCRIPTION

The aspects, features and advantages of the present technology will be appreciated when considered with reference to the following description of preferred embodiments and accompanying figures. The same reference numbers in different drawings may identify the same or similar elements. Furthermore, the following description does not limit the disclosure; rather, the scope of the technology is defined by the appended claims and equivalents.

In accordance with aspects of the present technology, a network transmitter has at least one multi-packet message pending to be sent to one or more receiving machines. As will be explained in more detail below, the network transmitter may be implemented on a network interface controller ("NIC") or software running on a processor. In addition, the present technology may also be applied to each priority or Quality of Service ("QoS") level.

Systems and methods are used to preemptively interleave individual data packets in specific patterns and consecutively transmit them to multiple receivers. In one scenario, the network transmitter may attempt to reduce the lengthy burst of data packets to be sent to multiple receivers. For instance, each remote procedure call ("RPC") response may comprise four data packets after undergoing a reduction process. The data packets in the first RPC are consecutively transmitted, followed by, the next RPC, and so on. Similarly, each RPC can comprise of data packets to be sent to various receivers in different patterns. In another scenario, the data packets may be sent in accordance with certain outbound limits. In yet another scenario, the data packets may be sent in accordance with certain inbound limits.

Figure 1:
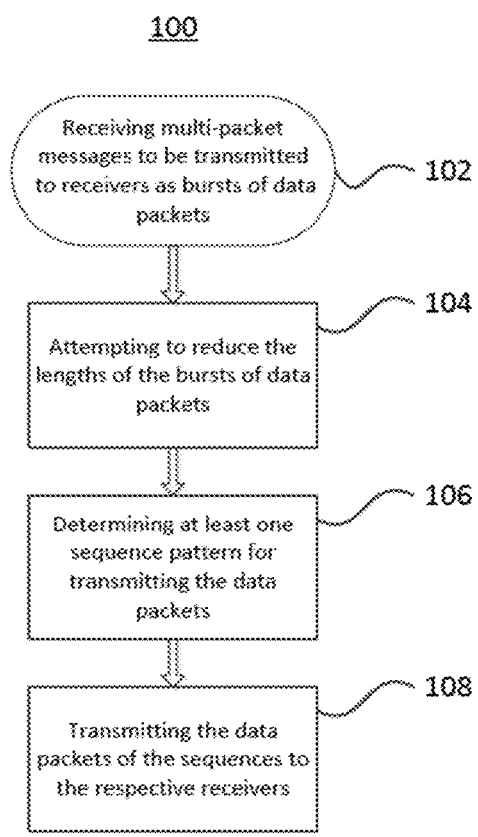
FIG. 1 is a flow diagram of a method for micro flow controlling the transmission of data packets over a network in accordance with one aspect of the present disclosure.

Referring to FIG. 1, flow diagram 100 depicts an example of micro flow controlling the transmission of data packets over a network. The transmitter receives multi-packet messages to be transmitted as bursts of data packets to various receivers at block 102. Next, the transmitter attempts to reduce the length of the burst of each multi-packet message by chopping it up or reducing its length into numerous chunks at block 104. These individual chunks may have one or more data packets therein. Subsequently, at step 106, one or more patterns can be determined to transmit the data packets from any chunk. Here, at least one processor can be used to determine the pattern(s). Further, the determined pattern(s) may depend on the transmission priority of the multi-packet messages or may depend on various limits imposed on either the transmitter or receiver. Finally, at block 108, the transmitter consecutively transmits together the data packets of the sequences.

Figure 2:
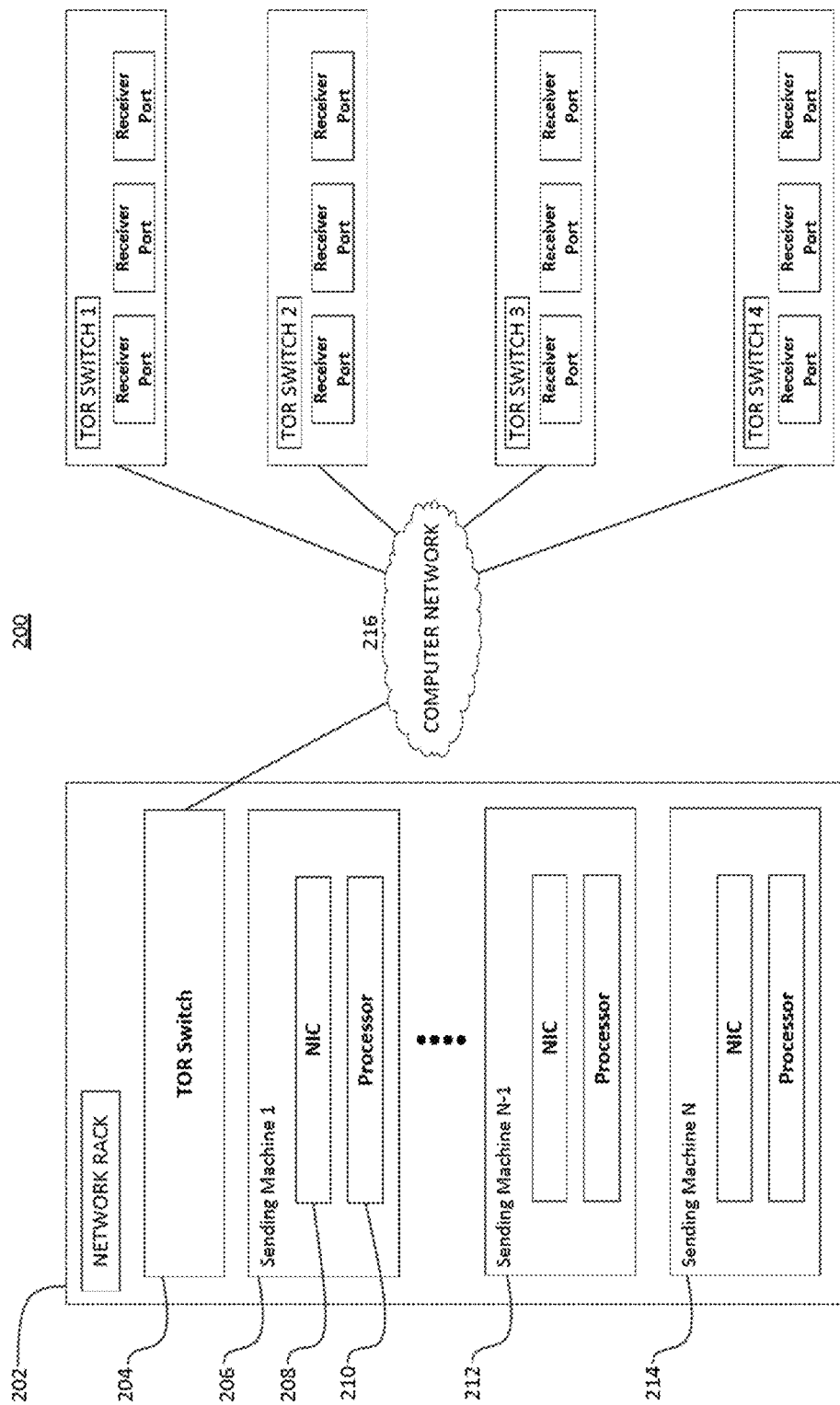
FIG. 2 illustrates components of a switching network in accordance with one aspect of the present disclosure.

FIG. 2 illustrates various components of a switching network 200 in accordance with aspects of the present disclosure. For example, this figure illustrates a network rack 202 that contains multiple sending machines 206, 212, and 214 connected to Top-Of-Rack ("TOR") switch 204 via cables, wires, or network fibers. The sending machines are shown in FIG. 2 as machines 1, . . . , N−1, and N. Here, "N" represents the number associated with the last sending machine in network rack 202. TOR switch 204 is connected to and communicates with a computer network 216. The computer network 216 is connected to and communicates with TOR switches 1, 2, 3, and 4 that are located in their respective network racks (not shown). Thus, as an illustrative example, sending machine 1 (206) is able to transmit a multi-packet message to TOR switch 1 by way of TOR switch 204 and computer network 216. Moreover, it may be possible that the network racks depicted in FIG. 2 as well as the network racks described in the present disclosure may hold both sending machines and receiving machines.

The various elements of FIG. 2 may be interconnected via a local or direct connection and/or may be coupled via a communications network such as a local area network ("LAN") such as a Wi-Fi network, a wide area network ("WAN"), the Internet, etc., and which may be wired or wireless. There may be other network components connected in between the depicted network elements of FIG. 2.

In one aspect, sending machine 1 (206) may have a NIC 208, one or more processors 210, and one or more memory storage devices (not shown) to facilitate communication between sending machine 1 and the network elements of FIG. 2 as well as other devices on the computer network 216. Network racks, such as network rack 202, may also be configured to accommodate a plurality of sending machines having their own individual NIC therein. For instance, there may be 20 or so sending machines having 20 or so corresponding NICs in network rack 202.

TOR switches 1-4 may be small port count switches. These TOR switches have multiple ports that are designed to accommodate connections to numerous computing devices. In addition, the TOR switches can be adapted to be easily installed and managed at data centers or facilities.

TOR switches 1-4 are connected to their respective receiving machines, and in turn, these machines can be connected to one or more computing devices including laptops, desktop PCs, netbooks, PDAs, smart phones, tablet PCs, etc. Each receiving machine connected to TOR switches 1-4 may be configured similarly to the sending machines in network rack 202, with a NIC, processor, and memory. These receiving machines may also include one or more user input devices and user output devices, such as a display, and may also be a general purpose computer, intended for use by a person, having all the components found in a personal computer such as a central processing unit ("CPU"), display, hard-drive, mouse, keyboard, CD-ROM drive, DVD drive, modem and/or router (telephone, cable, or otherwise) and all of the components used to connect these elements to the network.

Figure 3:
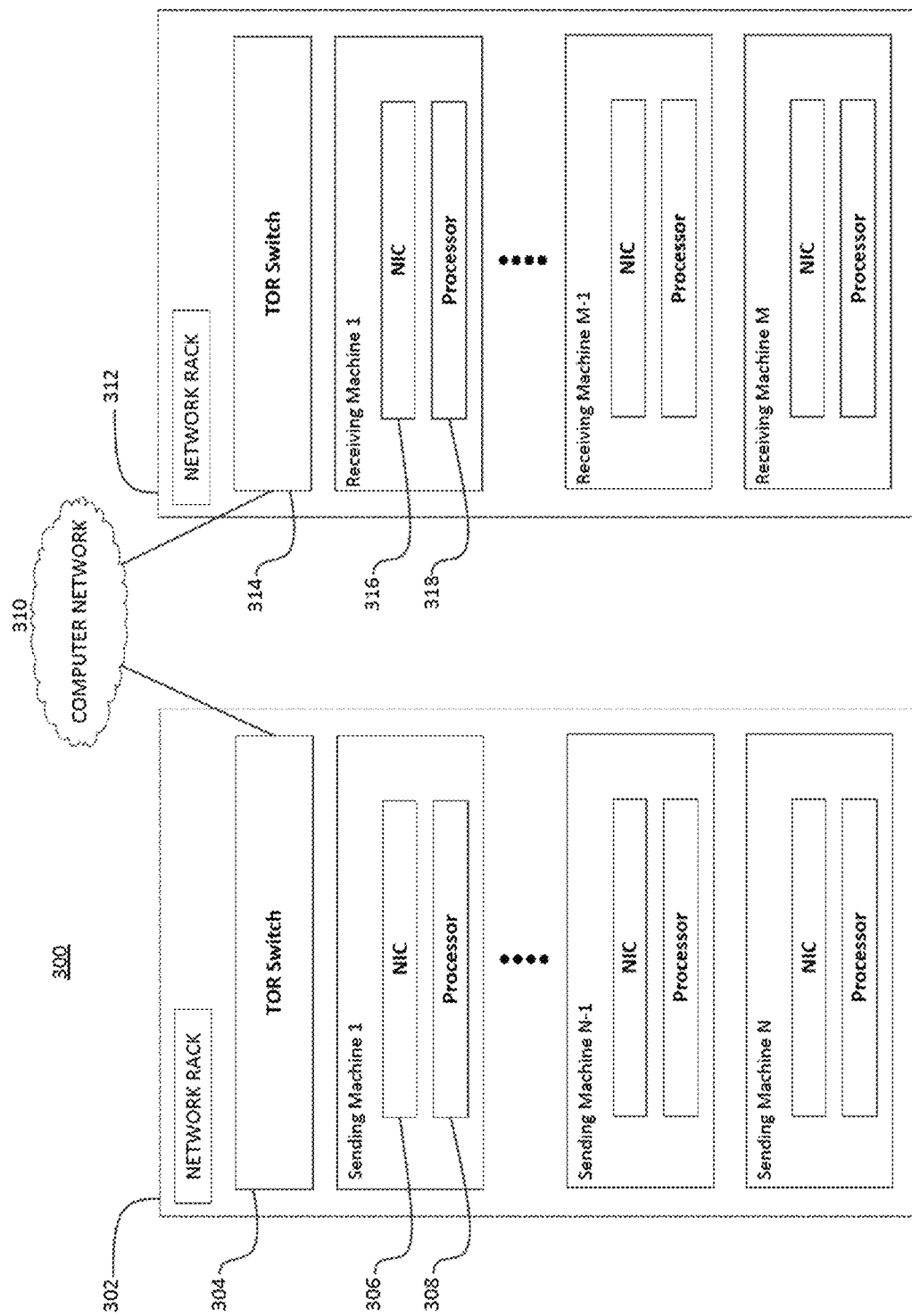
FIG. 3 illustrates the sending and receiving nodes of a switching network in accordance with one aspect of the present disclosure.

FIG. 3 illustrates the sending and receiving nodes of a switching network in accordance with aspects of the disclosure. As shown, sending machine 1 has a NIC 306 and a processor 308. There are N sending machines and M receiving machines illustrated in this example. Again, "N" represents the number associated with the last sending machine in network rack 302, and "M" represents the number associated with the last receiving machine in network rack 312. NIC 306 is a computer hardware component that connects sending machine 1 to TOR switch 304 and may be comprised of at least a DMA interface unit, a medium access control (MAC)

unit, memory, and control logic. NICs are preferably both Open Systems Interconnection ("OSI") physical layer and data link layer devices that may provide access to networking device via IEEE 802 and/or FDDI networks.

The processor 308 may be a CPU having one or more sub-processors. Alternatively, the processor may be a dedicated controller for executing operations, such as an ASIC. The sending machines in network rack 302 have memory that stores information accessible by the processors, including instructions that may be executed by the processor to control the NICs and data that may be retrieved or stored by the processor. The memory may be of any type of non-transitory storage device capable of storing information, such as hard-drive, ROM, RAM, CD-ROM, flash memories, or write-capable and/or read-only memories. As alluded to above, the NICs can also individually contain memory.

In one aspect, NIC 306 may have multi-packet messages that are simultaneously pending to be sent as lengthy bursts of data packets to the receiving machines in network rack 312 via TOR switch 304 to TOR switch 314. TOR switch 314 has one or more receiver ports that accommodate the connections to the one or more computing devices discussed above. Knowing where to send the data packets, NIC 306 may attempt to reduce the transmission length of the burst of the multi-packet messages into chunks that contain individual data packets and consecutively send these packets in different patterns to their designated receiving machines.

Attempting to "chop-up," and reduce the transmission lengths of long bursts of data packets by reordering and/or delaying the transmission of the long bursts of data packets to be sent to TOR switch 314 may be employed to alleviate the problem of dropped packets and transmission delay while numerous data packets are being sent from other sending computers in different network racks. In some instances, interfering traffic may also originate from either network racks 302 or 312.

As an illustrative example, assume NIC 306 has multi-packet messages simultaneously pending to be sent to receiving machines 1, M−1, and M via TOR switch 304 to TOR switch 314. Based on a transmission pattern best suited for the network at the time, NIC 306 may transmit a data packet to receiving machine 1, then a data packet to receiving machine M−1, and a data packet to receiving machine M. In this example, the data packets corresponding to the different messages are consecutively transmitted together within a short burst of time. As will be explained in more detail below with regard to FIG. 5B, this pattern may be repeated until all four multi-packet messages are transmitted to their respective receiving machines.

In another illustrative example, the messages ready to be sent to receiving machines 1 and M−1 may need to be sent sooner than the messages ready to be sent to receiving machine M. Accordingly, NIC 306 may transmit a packet to receiving machine 1, a packet to receiving machine M−1, then a second packet to receiving machine 1, and a second packet to receiving machine M−1. Meanwhile, the packets to receiving machine M are interleaved after every four packets to receiving machines 1 and M−1. Again, this pattern may be repeated until all messages are transmitted to their respective receiving machines. In this particular sequence, more data packets are sent to receiving machines 1 and M−1 sooner. Thus, NIC 306 implementing this pattern will allow the messages to machines 1 and M−1 to be sent sooner than the message to receiving machine M.

Figure 4:
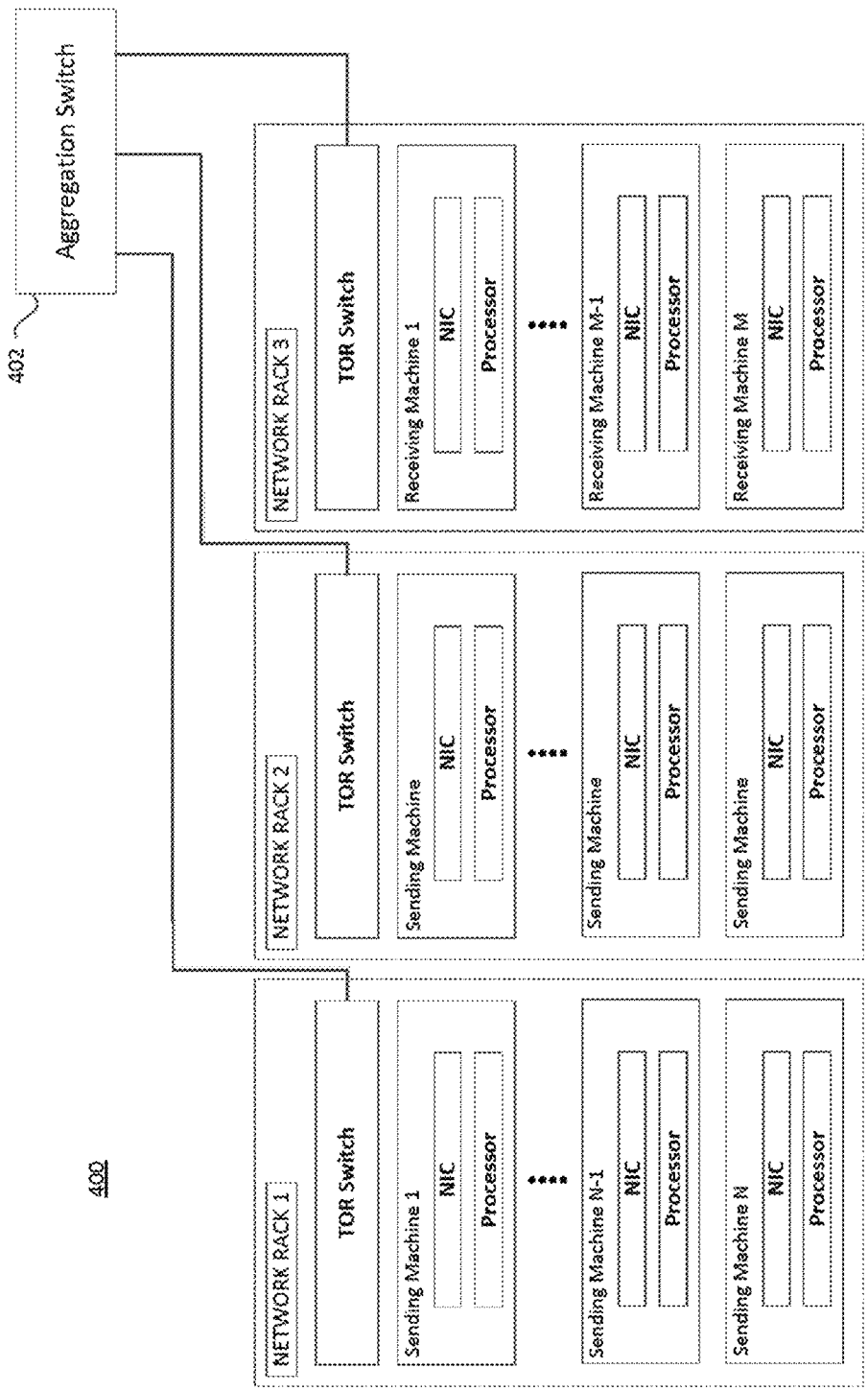
FIG. 4 illustrates an exemplary configuration of a switching network with outbound and inbound limits at the sending and receiving nodes in accordance with one aspect of the present disclosure.

FIG. 4 illustrates an exemplary configuration of a switching network 400 with outbound and inbound limits at the sending and receiving nodes of the network, respectively. As shown, the TOR switches at the top of network racks 1, 2, and 3 are connected to an aggregation switch 402. The sending nodes, network racks 1 and 2, each contain a plurality of sending machines. The receiving node, network rack 3, contains receiving machines 1 through M. Like the sending machines depicted in FIGS. 2 and 3, each sending and receiving machine in FIG. 4 has at least a NIC and a processor. Moreover, the NICs in network racks 1, 2, and 3 connect to their respective TOR switches via cables, wires, or network fibers. It may also be possible that some of the machines are both sending and receiving packets simultaneously. In one aspect, an outbound limit occurs at the TOR switch in network rack 1 when the instant aggregate transmission bandwidth of the sending machine(s) exceeds the bandwidth of the link that connects the TOR switch to aggregation switch 402. Consequently, the transmission rate of the sending machines may have to be reduced, such as to half speed. In this instance, the one or more NICs may have to take affirmative steps to flow control its stream of data packets in view of the reduced rate of packet transmission.

On the other side of transmission, an inbound limit occurs at the TOR switch in network rack 3 if the instant aggregate bandwidth of the sending machines in network racks 1 and 2 exceeds the bandwidth of the links from the TOR switch in network rack 3 to the various receiving machines. Consequently, the inbound limit causes severe data packet congestion at the buffer of the receiving TOR switch. In this illustrative example, the NICs in the sending machines at network racks 1 and 2 may have to take affirmative steps to slow down sending data packets to congested TOR switches. Thus, the NICs may interleave packets going to different TOR switches or receiving machines in order to lessen the arrival rate of the packets at a congested switch, while maintaining efficiency of the sending NICs and network-link time.

Figure 5A:
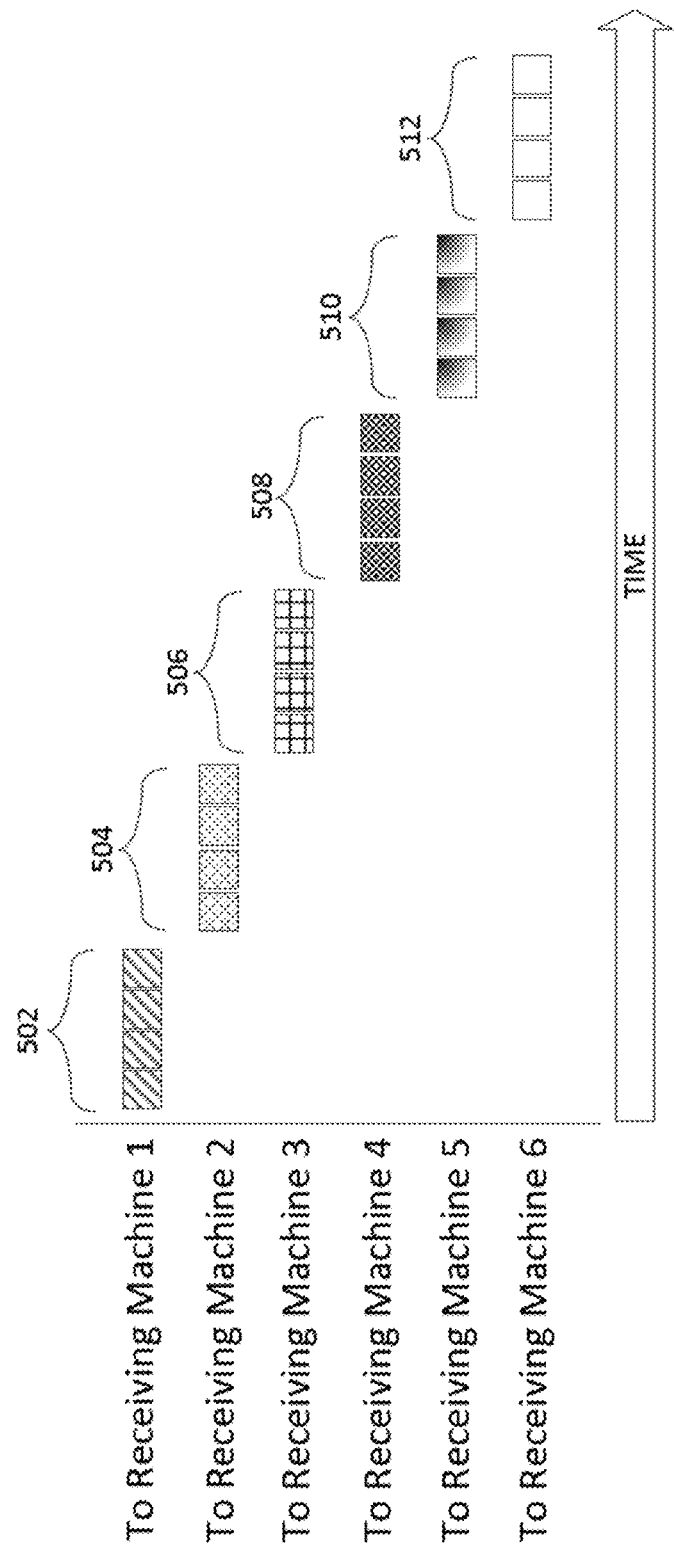
FIG. 5A is a timing diagram of a transmission sequence pattern of data packets to various receiving machines.
Figure 5C:
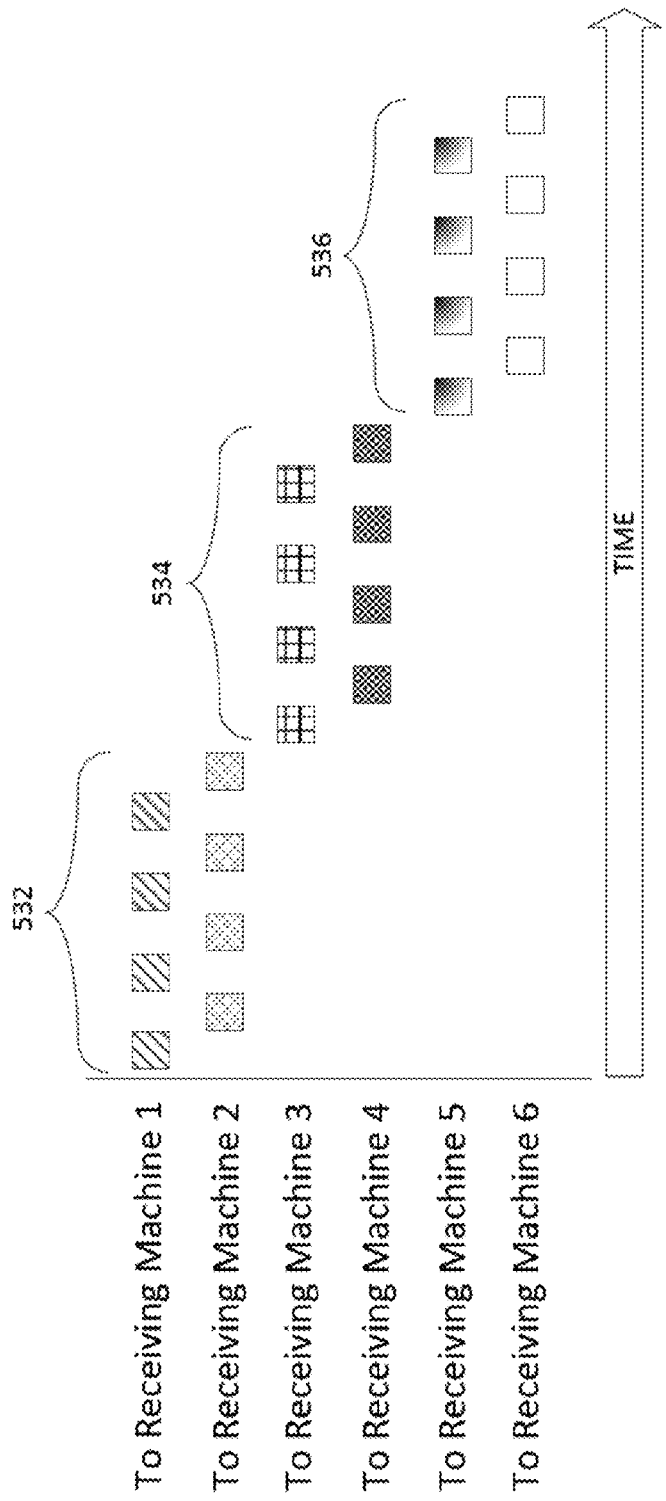

FIG. 5A illustrates a timing diagram of a packet transmission pattern of data packets to various receiving machines. FIGS. 5B-D illustrate timing diagrams of exemplary packet transmission patterns of micro flow controlled data packets to various receiving machines in accordance with aspects of the present disclosure. In all of these figures, time flows from left to right as indicated by the arrow. The illustrated data packets each correspond to a respective multi-packet message based on the different hatching patterns.

FIG. 5A illustrates a timing diagram of a NIC transmitting data packets to receiving machines 1-6. With six different lengthy multi-packet messages simultaneously pending to be sent to six different receiving machines, the NIC attempts to chop-up and reduce the transmission lengths of the long burst of packets sent to each target receiver by reordering and/or delaying the transmission of the long burst of packets. This may be done with various reduction techniques.

Attempting to shorten lengthy bursts of data packets is helpful, because if multi-packet messages are all simultaneously sent as one long burst, then the chances of creating outbound and inbound congestion increase. Accordingly, when long bursts of data packets are being sent over a computer network, the transmissions of these data packets may reordered or delayed.

Any form of reducing the transmission lengths of the lengthy messages into separate packets by reordering and/or delaying the transmission of the long burst of packets can be employed by the micro flow process discussed herein. The NIC may also situationally adjust the number of packets within each RPC transmission.

In FIG. 5A, the NIC attempts to reduce the transmission lengths of six different lengthy bursts of multi-packet messages down to a burst of four packets in each RPC. As depicted, all four data packets in RPC 502 are sequentially and consecutively sent together to receiving machine 1. Next, all four data packets in RPC 504 are consecutively sent together to receiving machine 2. Then, all four data packets in RPC 506 are consecutively sent together to receiving machine 3. Thereafter, all four data packets in RPC 508 are consecutively sent together to receiving computer 4. Similarly, all four data packets in RPC 510 are again consecutively sent together to receiving machine 5. And finally, all four data packets in RPC 512 are consecutively sent together to receiving machine 6.

After the last RPC in that sequence, RPC 512, is sent to receiving machine 6, the NIC may repeat the above pattern until the data packets in all of the RPCs for each multi-packet message are transmitted to their corresponding receiving machines. For instance, the NIC may repeat the pattern up to N times, where N represents the last sequence that contains the final data packets in the multi-packet messages. It is possible that transmitting bursts of four packet to each receiving machine as illustrated in FIG. 5A may exceed the buffer space of the TOR switch accommodating receiving machines 1-6 in the network rack.

In other scenarios, the NIC may reorder packets destined for different receiving machines and send a burst of one (or more) packet(s) to each receiving machine, and repeat this pattern until all the data packets associated with the different messages are sent. For instance, the NIC micro flow controls the different messages by reordering each packet burst in a round-robin interleave. For example, FIG. 5B depicts the first transmission sequence 522 comprising the first packet from RPC 502 in FIG. 5A, the first packet from RPC 504, the first packet from RPC 506, the first packet from RPC 508, the first packet from RPC 510, and the first packet from RPC 512. Similarly, the second transmission sequence 524 comprises the second packets from the same six RPCs, the third transmission sequence 526 comprises the third packets, and the fourth transmission sequence 528 comprises the fourth packets as shown.

The NIC may repeat this transmission pattern until all the data packets for each message are transmitted to their corresponding receiving machines. Accordingly, in this example, each receiving machine, e.g., receiving machine 1, receives only one packet every six packet transmission iteration. One advantage of interleaving the data packets this way is to reduce buffer stress and inbound congestion at the individual TOR switches by the inherent transmission delay in the pattern sequence. While six receiving machines are illustrated, the process may be performed for less than or more than this number of machines.

In yet another scenario, the NIC may micro flow control the messages by reorder packets destined for different sets or groups of receiving machines, for instance by interleaving and consecutively transmitting together one or more data packets of the first two messages, then interleaving and consecutively transmitting together one or more data packets of the next two messages, and so on. Referring now to FIG. 5C, the first transmission sequence 532 comprises the first packet from RPC 502 in FIG. 5A, the first packet from RPC 504, the second packet from RPC 502, the second packet from RPC 504, the third packet from RPC 502, the third packet from RPC 504, the fourth packet from RPC 502, and the fourth packet from RPC 504.

Likewise, the second sequence 534 comprises the first packet from RPC 506 in FIG. 5A, the first packet from PRC 508, the second packet from RPC 506, the second packet from RPC 508, the third packet from RPC 506, the third packet from RPC 508, the fourth packet from RPC 506, and the fourth packet from RPC 508. The last sequence 536 depicted in FIG. 5C comprises the first packet from RPC 510, the first packet from RPC 512, the second packet from RPC 510, the second packet from RPC 512, the third packet from RPC 510, the third packet from RPC 512, the fourth packet from RPC 510, and the fourth packet from RPC 512.

Once again, the NIC may repeat this transmission pattern until all the data packets in the RPCs for each message are transmitted to their corresponding receiving machines. One advantage of interleaving the data packets this way is to reduce and alleviate buffer stress at the TOR switch, e.g., by a factor of two. Accordingly, the NIC implementing this pattern preemptively and unilaterally relieves buffer stress and packet traffic by allowing receiving machines 1 and 2 to collect their data packets sooner.

In another example, the NIC may micro flow the multi-packet messages by consecutively transmitting together data packets in limited, short bursts of, e.g., two to eight packets to a target receiver instead of transmitting only a single packet. Thereafter, a similar short burst of data packets are sent to the next receiver, and then repeating back to another short burst of data packets to the first receiver. In FIG. 5D, multi-packet messages are simultaneously pending to be sent to receiving machines 1 and 2. Like the examples above, the NIC attempts to reduce the transmission length of the burst of the MTU packets. However, the reduced length may range between two to eight packets. Here, a short burst of four data packets in RPC 540 are consecutively transmitted to receiving machine 1, then a short burst of four data packets in RPC 542 are consecutively transmitted to receiving machine 2, and then the NIC repeats back to another short burst of four packets in RPC 544 to receiving machine 2.

The NIC may micro flow control the messages in the manner depicted in FIG. 5D if any part of the transmission path has some per-packet overhead whenever the destination repeatedly changes between consecutive packets, but less overhead if several consecutive packets have the same destination. In other words, the pattern is particularly helpful if a part of the network mechanism imposes additional work or delay when consecutive packets have differing destinations. While FIG. 5D illustrates short bursts of four data packets in each RPC, the number of packets in each RPC may vary depending on the per-packet overhead at the time of transmission.

Figure 6:
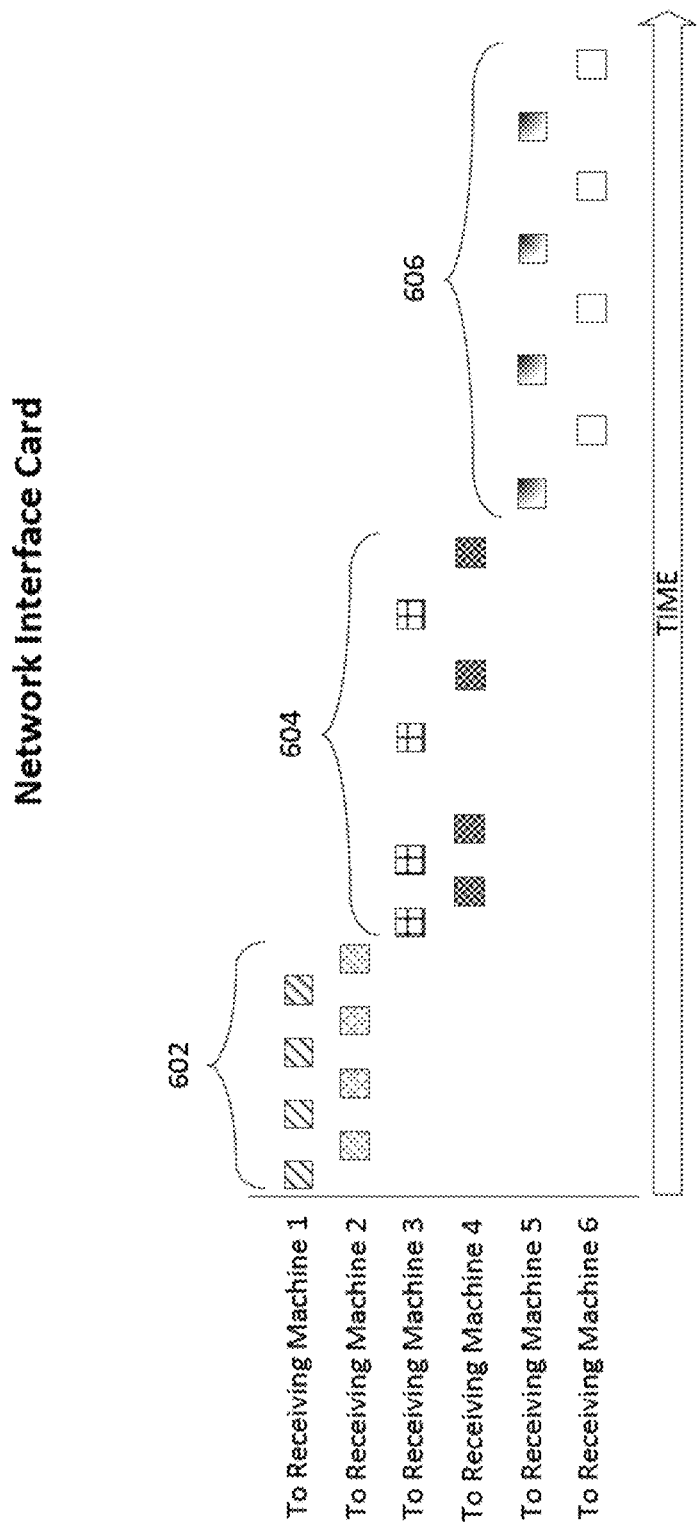
FIG. 6 is a timing diagram of an exemplary transmission sequence pattern of micro flow controlled data packets with outbound limits in accordance with one aspect of the present disclosure.

FIG. 6 depicts an exemplary timing diagram of a transmission pattern with outbound limits. As an illustrative example, outbound limits may be imposed on the NIC when the uplink bandwidth is limited for a variety of reasons. When this occurs, the NIC may interleave the data packets in a sequence pattern that does not delay the transmission of all the RPCs. In FIG. 6, the data packets in sequence 602 are being sent to receiving machines 1 and 2 at a standard rate of transmission. However, after an outbound limit is imposed midway through sequence 604, the rate of transmission is cut in half. This is apparent from the larger time gaps between the last four data packets of sequence 604 compared to the first four data packets in that sequence. Meanwhile, the transmission rate of sequence 606 is entirely cut in half compared to the rate in sequence 602. While a 50% reduction in the rate is illustrated in this example, a greater or lesser rate reduction may be employed.

In order to prevent transmission delay of all the multi-packet messages to their respective receiving machines, the pattern depicted in FIG. 5C may be used in the example of FIG. 6. As described above, the pattern in FIG. 5C ensures that the buffering stress at the TOR switch accommodating the receiving machines is reduced, e.g., by a factor of two and allows receiving machines 1 and 2 to collect their data packets sooner.

FIG. 7 depicts an exemplary timing diagram of a transmission pattern with inbound limits. The data packets in sequence 702 are being sent at a standard rate of transmission. However, inbound limits may be imposed on certain receiving machines, e.g., machines 3 and 4. Specifically, the buffers at the TOR switch may be congested and require that the outbound queues to be rate limited to no more than half speed of the standard rate of transmission. This is apparent from the larger time gaps between the data packets of sequence 704 compared to the time gaps between the packets of sequences 702, 706, or 708. Accordingly, the transmission of the data packets in sequences 706 and 708 will be significantly delayed if they are sent after the transmission of rate-limited sequence 704.

Rather than unnecessarily delaying the transmission of the data packets in sequences 706 and 708 by waiting until rate-limited sequence 704 has been sent, the NIC may interleave those data packets in between the time gaps of rate-limited sequence 704. As shown in FIG. 7, the data packets of sequence 706 are interleaved in between the transmission time gaps of sequence 704. Similarly, the data packets of sequence 708 are interleaved in between the transmission time gaps of 704. Therefore, the data packets of sequences 706 and 708 may be sent to receiving machines 5 and 6 at the same time rate-limited sequence 704 is being sent to receiving machines 3 and 4. The NIC may repeat this transmission pattern until all the RPCs for each message are transmitted to their corresponding receiving machines. This example demonstrates transmission efficiency while inbound limits are imposed at the TOR switch on the receiving end of the switching network.

In the exemplary timing diagrams of FIGS. 5A-C, FIG. 6, and FIG. 7, it is possible to implement a last stage that comprises multiple priority classes, each of which might have a number of round-robin queues. There may be only a few number of data packets prefetched into each of these round-robin queues. Thus, the NIC may allow any blocks or limits on the flow rate of transmission to stop each of the round-robin queues quickly.

In addition to micro flow controlling the transmission of data packets over a network by unilaterally and preemptively patterning the packets in various ways, the NIC may limit any single message flow to only a fraction of the transmission rate. Accordingly, the NIC limiting transmission rates is another way of micro flow controlling the transmission of data packets and also alleviates stress on the switching fabric.

Normally, a suitable environment for the present technology will be in datacenters or switching centers that house a collection of communicating machines. However, it is not restricted to only those environments.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Furthermore, while particular processes are shown in a specific order in the appended drawings, such processes are not limited to any particular order unless such order is expressly set forth herein.

The invention claimed is:

1. A method for transmitting packets over a computer network via a network interface device, the method comprising:
   obtaining a plurality of messages to be transmitted, via the network, as bursts of data packets to a plurality of respective receivers, wherein one or more data packets of each burst associated with one of the plurality of messages are arranged to be transmitted in a particular time block;
   determining, by the network interface device, a respective receiver for each of the plurality of messages;
   the network interface device arranging, in an order, the one or more data packets of each burst for transmission to different ones of the plurality of respective receivers;
   generating, by the network interface device, a first transmission sequence pattern by interleaving one or more data packets associated with a first one of the plurality of messages with one or more data packets associated with a second one of the plurality of messages based on the determined respective receivers for each of the plurality of messages;
   applying an outbound limit to the first transmission sequence pattern, the outbound limit reducing a rate of transmission of the interleaved data packets of the first transmission sequence pattern;
   and transmitting, by the network interface device, in a first time block, the interleaved data packets of the first transmission sequence pattern consecutively to the respective receivers, whereby transmission of the interleaved data packets in the first time block according to the outbound limit elongates a length of time of the first time block.

2. The method of claim 1, further comprising transmitting, in a second time block following the first time block, one or more data packets associated with a third message.

3. The method of claim 1, further comprising:
   generating, by the network interface device, a second transmission sequence pattern by interleaving one or more data packets associated with a third message with one or more data packets associated with a fourth message; and
   transmitting, in a second time block, the interleaved data packets of the second transmission sequence pattern consecutively to the respective receivers after the first time block.

4. The method of claim 1, wherein the rate of transmission is reduced in half.

5. The method of claim 1, further comprising defining an inbound limit associated with data packet congestion at a buffer of the respective receiver, the inbound limit reducing a rate of transmission of the interleaved data packets of the first transmission sequence pattern, whereby transmission of the interleaved data packets of the first transmission sequence pattern according to the inbound limit elongate a length of time of the first time block.

6. The method of claim 5, further comprising:
   interleaving, by the network interface device, one or more data packets associated with a third message in between one or more time gaps of the elongated length of time of the first time block; and
   transmitting the one or more data packets associated with the third message consecutively together in the elongated first time block.

7. The method of claim 1, further comprising defining an inbound limit associated with the data packet congestion at a buffer of the respective receiver, the inbound limit reducing a rate of transmission of the interleaved data packets of the second transmission sequence pattern, whereby transmission of the interleaved data packets of the second transmission sequence pattern according to the inbound limit elongate a length of time of the second time block.

8. The method of claim 7, further comprising:
 interleaving, by the network interface device, one or more data packets associated with one or more remaining messages in between one or more time gaps of the elongated length of time of the second time block; and
 transmitting the one or more data packets associated with the remaining messages consecutively together in the elongated second time block.

9. A system for controlling packet transmission over a computer network, comprising:
 at least one network interface device configured to:
  obtain a plurality of messages to be transmitted, via the network, as bursts of data packets to a plurality of respective receivers, wherein one or more data packets of each burst associated with one of the plurality of messages are arranged to be transmitted in a particular time block;
  determine a respective receiver for each of the plurality of messages;
  arrange, in an order, the one or more data packets of each burst for transmission to different ones of the plurality of respective receivers;
  generate a first transmission sequence pattern by interleaving one or more data packets associated with a first one of the plurality of messages with one or more data packets associated with a second one of the plurality of messages based on the determined respective receivers for each of the plurality of messages; and
  apply an outbound limit to the first transmission sequence pattern, the outbound limit reducing a rate of transmission of the interleaved data packets of the first transmission sequence pattern;
 a transmitter module controlled by at least one processor, the transmitter module being configured to:
  transmit, in a first time block, the interleaved data packets of the first transmission sequence pattern consecutively to the respective receivers, whereby transmission of the interleaved data packets in the first time block according to the outbound limit elongates a length of time of the first time block.

10. The system of claim 9, wherein:
 the transmitter module is further configured to transmit, in a second time block following the first time block, one or more data packets associated with a third message.

11. The system of claim 9, wherein:
 the network interface device is further configured to generate a second sequence pattern by interleaving one or more data packets associated with a third message with one or more data packets associated with a fourth message; and
 the transmitter module is further configured to transmit, in a second time block, the interleaved data packets of the second transmission sequence pattern consecutively to the respective receivers after the first time block.

12. The system of claim 9, wherein the rate of transmission is reduced in half.

13. The system of claim 9, wherein the system is further configured to define an inbound limit associated with data packet congestion at a buffer of the respective receiver, the inbound limit reduces a rate of transmission of the interleaved data packets of the first transmission sequence pattern, whereby transmission of the interleaved data packets of the first transmission sequence pattern according to the inbound limit which elongates a length of time of the first time block.

14. The system of claim 13, wherein:
 the network interface device is further configured to interleave one or more data packets associated with a third message in between one or more time gaps of the elongated length of time of the first time block; and
 the transmitter module is further configured to transmit the one or more data packets associated with the third message consecutively together in the elongated first time block.

15. The system of claim 9, wherein the system is further configured to define an inbound limit associated with the data packet congestion at a buffer of the respective receiver, the inbound limit reduces a rate of transmission of the interleaved data packets of the second transmission sequence pattern according to the inbound limit which elongates a length of time of the second time block.

16. The system of claim 15, wherein:
 the network interface device is further configured to interleave one or more data packets associated with one or more remaining messages in between one or more time gaps of the elongated length of time of the second time block; and
 the transmitter module is further configured to transmit the one or more data packets associated with the remaining messages consecutively together in the elongated second time block.

17. A method for transmitting packets over a computer network via a network interface device, the method comprising:
 obtaining a plurality of messages to be transmitted, via the network, as bursts of data packets to a plurality of receivers, wherein data packets of each burst associated with one of the plurality of messages are arranged to be transmitted in a particular time block;
 determining, by the network interface device, a respective receiver for each of the plurality of messages;
 the network interface device arranging, in an order, the one or more data packets for transmission to different ones of the plurality of respective receivers;
 generating, by the network interface device, a first transmission sequence pattern comprising at least two data packets associated with a first message, based on the determined respective receiver for the first message;
 applying an outbound limit to the first transmission sequence pattern, the outbound limit reducing a rate of transmission of the at least two data packets of the first transmission sequence pattern;
 generating, by the network interface device, a second transmission sequence pattern comprising at least two data packets associated with a second message, based on the determined respective receiver for the second message;
 generating, by the network interface device, a third transmission sequence pattern comprising at least two data packets associated with the first message, based on the determined respective receiver for the first message;
 transmitting, by the network interface device, in a first time block, the data packets of the first transmission sequence pattern consecutively to the determined respective receiver for the first message, whereby transmission of the at least two data packets in the first time block according to the outbound limit elongates a length of time of the first time block;
 transmitting, by the network interface device, in a second time block, the data packets of the second transmission sequence consecutively to the determined respective receiver for the second message after the first time block; and transmitting, by the network interface device, in a third time block, the data packets of the third transmission sequence consecutively to the determined respective receiver for the first message after the first time block.

18. A system for controlling packet transmissions over a computer network, comprising:
    at least one network interface device; and
    a transmitter module controlled by at least one processor;
    wherein the network interface device is configured to:
        obtain a plurality of messages to be transmitted, via the network, as bursts of data packets to a plurality of receivers, wherein data packets of each burst associated with one of the plurality of messages are to be transmitted in a particular time block;
        determine a respective receiver for each of the plurality of messages;
        arrange in, an order, the one or more data packets of each burst for transmission to different ones of the plurality of respective receivers;
        generate a first transmission sequence pattern comprising at least two data packets associated with a first message, based on the determined respective receiver for the first message;
        apply an outbound limit to the first transmission sequence pattern, the outbound limit reducing a rate of transmission of the at least two data packets of the first transmission sequence pattern;
        generate a second transmission sequence pattern comprising at least two data packets associated with a second message, based on the determined respective receiver for the second message;
        generate a third transmission sequence pattern comprising at least two data packets associated with the first message, based on the determined respective receiver for the first message, and
    wherein the transmitter module is configured to:
        transmit, in a first time block, the data packets of the first transmission sequence pattern consecutively to the determined respective receiver for the first message, whereby transmission of the at least two data packets in the first time block according to the outbound limit elongates a length of time of the first time block;
        transmit, in a second time block, the data packets of the second transmission sequence consecutively to the determined respective receiver for the second message after the first time block; and
    transmit, in a third time block, the data packets of the third transmission sequence consecutively to the determined respective receiver for the first message after the first time block.

* * * * *